Oct. 17, 1967 E. J. BEALL 3,347,204

INDICIA INDICATOR

Filed May 31, 1966

ELVYN J. BEALL
INVENTOR

Huebner & Worrel
ATTORNEYS

United States Patent Office 3,347,204
Patented Oct. 17, 1967

3,347,204
INDICIA INDICATOR
Elvyn J. Beall, 1001 Country Club Drive,
Modesto, Calif. 95350
Filed May 31, 1966, Ser. No. 554,943
1 Claim. (Cl. 116—133)

The present invention relates generally to a device for visually presenting and recording a plurality of indicia in a desired order, and more specifically to such a device adapted for indicating telephone numbers in a selective and readily changeable manner.

While the present invention is broadly applicable for presenting and temporarily indicating a plurality of selected indicia in a desired order of presentation, it is especially useful for indicating telephone numbers, particularly in areas where seven numerals are utilized rather than a combination of letters and numerals.

It is accordingly a principal object of the present invention to provide a phone number indicator of simple design and construction, which is readily susceptible of mounting on the cover of a telephone directory, or alternatively can be incorporated as an integral part of a telephone directory cover.

It is an additional object to provide a device of the type described wherein a telephone number can be selectively indicated by turning one or more of a series of rotatably mounted discs having indicia such as numerals on one face thereof, the construction being such that one indicia on each disc will be visually exposed at any given rotational position of the disc.

A further object is to provide a telephone number indicator which is susceptible of so mounting with respect to a telephone directory that, after setting of the various discs to indicate the telephone number, the telephone directory can be closed and the telephone number will remain in view for subsequent reference.

An additional object is to provide a telephone number indicator of the type described which is susceptible of easy adjustment to vary the number indicated and which at the same time can be selectively used as a permanent telephone number indicator.

It is also an object to provide a device of the nature described incorporating a construction such that it is usable as a stiffening support for the edge of a telephone directory cover, to thereby prevent or retard damage to the edge of the cover during normal use of the directory.

Additional objects and advantages of the present invention will be more readily understood from the following detailed description of embodiments thereof when taken together with the accompanying drawings in which.

Figures 1, 2:
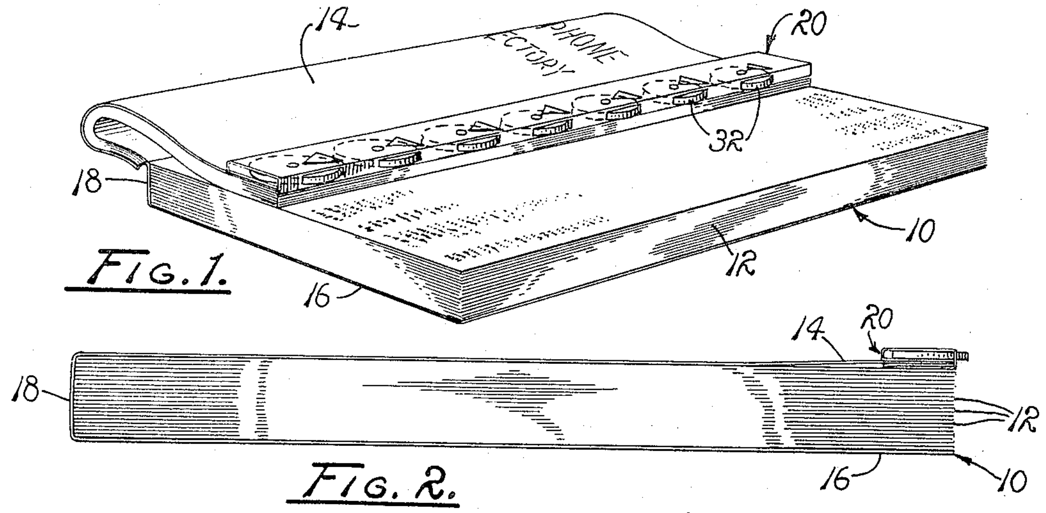
FIG. 1 is a perspective view of a partially opened telephone directory or the like having an embodiment of the telephone number indicator of the present invention attached thereto.
FIG. 2 is an end elevational view of a telephone directory with the device of the present invention attached in operative position to an edge of the directory cover.
Figure 3:
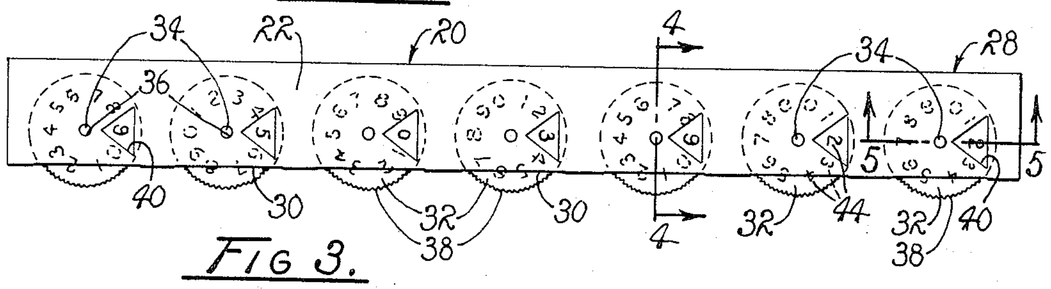
FIG. 3 is a plan view of the device of the present invention.

Referring now in more detail to the embodiments of the invention incorporated in the drawings, a telephone directory or the like is generally indicated at 10. In a usual manner the telephone directory consists of a plurality of pages 12 together with a top cover 14 and a bottom cover 16, with an edge binding 18 which serves to hold the directory in assembled condition. In FIGS. 1 and 2 there is illustrated one embodiment of the telephone number indicator of the present invention, generally designated 20, and as will be seen from these figures of the drawings the device is mounted along the free edge of the top cover 14 of the directory. As will be described hereinafter however, the present invention can be incorporate as an integral portion of the directory cover or otherwise affixed thereto.

Figure 4:
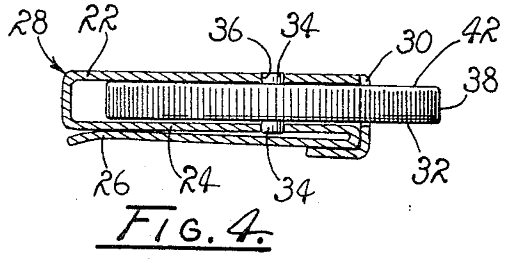
FIG. 4 is a sectional view taken on line 4—4 of FIG. 3, a portion being shown in full lines for clarity of details.
Figure 5:
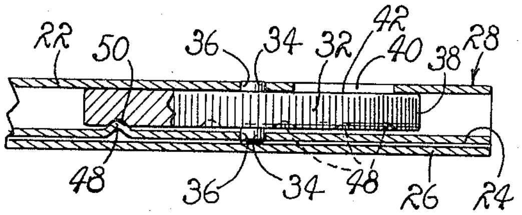
FIG. 5 is a fragmentary sectional view taken on line 5—5 of FIG. 3, parts being shown in full lines for clarity.

The telephone number indicator 20 can consist of a top section 22, a middle section 24 and a bottom section 26. The indicator is preferably formed of a material susceptible of being formed, bent or otherwise shaped into the form shown in FIG. 4, and this material can conceivably consist of plastic, metal, heavy paper and similar materials. In the embodiment shown in FIGS. 1 through 5 inclusively, the various sections are so bent as to form a longitudinally extended housing or casing generally designated 28, and the bottom section 26 provides a spring action between the bottom and middle sections adapted for frictionally retaining the indicator on the edge of the cover of the directory.

A plurality of slots 30 are formed along one edge of the housing 28 in spaced relation to one another. A plurality of discs 32 are rotatably mounted within the casing 28 by means of studs 34 or the like, which can be formed integrally with the disc or as a member extending through the disc with the ends thereof extended. Holes 36 are provided in the top and middle sections 22 and 24 respectively in which the ends of studs 34 are rotatably mounted or supported. As will be seen from FIG. 4 of the drawings a portion of each disc 32 extends through one of the slots 30, and preferably the edges of the discs are knurled, as indicated at 38. The purpose of the extended portions and the knurled edges is to facilitate desired selective rotation of the discs in a readily understandable manner.

The top section 22 is also provided with a plurality of openings 40, which can be of any desired configuration and are equal in number to the number of discs mounted in the casing. Each disc carries on its upper face 42 a plurality of indicia such as numbers 44 arranged in a circular manner, and when the device is to be used as a telephone number indicator, for example, each disc has on the face thereof 10 digits or numbers 44 from zero through nine inclusive. The numbers are so arranged on their respective discs that upon rotation of a disc only a single number is visually presented through an opening 40. In the embodiment of the invention described herein the telephone number indicator includes an array of seven discs to correspond with the usual number of digits in a telephone number.

In order to properly position and retain the discs in the desired rotated or indexed position, the lower face 46 of each disc is provided with a plurality of pockets or indentations 48 corresponding in number to the digits carried on the top face, and so positioned with respect thereto that upon cooperation with one or more protrusions 50 formed in and upwardly extending from the middle section 24, the discs are frictionally retained in a desired indexed position.

It will be obvious from the foregoing description that each of the discs upon being selectively rotated, starting with the disc at one end and selectively rotating, as desired, subsequently sequential discs, a telephone number can be visually presented and, due to friction, will be maintained until a subsequent rotation of one or more of the discs to present and indicate a different telephone number or other intelligence.

The numerals can be of any desired form or construction, such as indented, embossed, marked or otherwise visually represented. Also the material which forms the casing is preferably of sufficient strength and rigidity not only to maintain and mount the discs therein, but additionally to serve as a strengthening member for the edge of a telephone directory cover. In the above described embodiment of the invention, with particular reference to that shown in FIGS. 1 through 5 inclusively, the indicator is adapted for connection on an edge of a standard construction or type of telephone directory cover.

Figure 6:
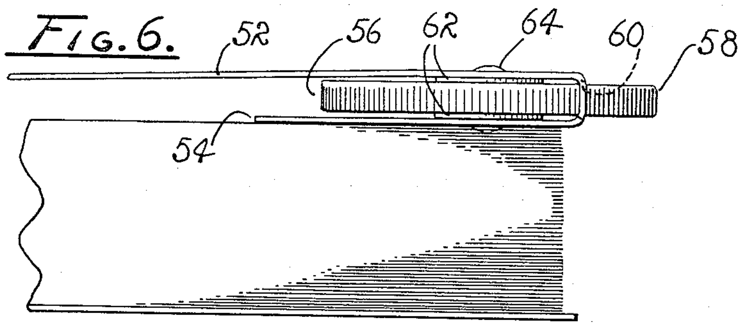
FIG. 6 is a fragmentary end elevational view of a telephone directory showing another form of the present invention wherein the structure is incorporated in the directory construction.

In FIG. 6 a second form of the invention is shown. In this embodiment the telephone book cover is indicated at 52, and has an edge portion 54 thereof bent back upon itself to form a cavity 56 adapted for mounting therein the plurality of discs such as at 58, with portions of the discs extending through slots 60 in a manner similar to the previously described embodiment.

Frictional spacers or washers 62 are mounted on each side of the discs 58, and a rivet 64 or the like extends through the two portions of the cover, the spacers, and the disc to rotatably mount the discs in operative position. It will be obvious that when a disc of this embodiment of the invention is rotated to visually present a desired number through an opening similar to the other embodiment, the disc is frictionally held in the so rotated position by means of the frictional washers, much in the same manner as the pockets and protrusions 48 and 50 of the previously described embodiment.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

In combination, a telephone directory having a cover providing an edge portion, said edge portion of the cover being folded back upon itself in spaced relation, the bight of the folded back edge portion having slot means therein, a plurality of discs each having a face and being rotatably mounted between said folded edge portion of said cover and being individually extended through said slot means, indicia on the faces of said discs selectively presentable through said slot means for visual inspection by rotational positioning of said discs, means coacting with each disc for visually indicating a single indica thereon upon rotation to a predetermined indexed position, and frictional spacers interposed between each said face of said discs and the juxtaposed folded edge portion to frictionally retain said discs in adjusted positions, the selected rotation of one or more of said discs presenting a visual indicator consisting of a plurality of said indicia in a desired order.

References Cited

UNITED STATES PATENTS

| | | | |
|---|---|---|---|
| 1,018,816 | 2/1912 | Eilers | 116—119 |
| 1,725,976 | 8/1929 | Canode | 235—114 |
| 1,786,809 | 12/1930 | Wolyn | 116—133 |
| 2,252,487 | 8/1941 | Bevill | 116—133 |
| 2,533,883 | 12/1950 | Geib | 116—133 |
| 2,842,314 | 7/1958 | McKenneth | 116—133 |
| 2,866,601 | 12/1958 | Naber | 235—114 |
| 2,945,312 | 7/1960 | Book | 40—68 |
| 2,976,621 | 3/1961 | Lowe | 235—110 |
| 2,996,247 | 8/1961 | Shell | 235—114 |
| 3,297,249 | 1/1967 | Light | 235—114 |

LOUIS J. CAPOZI, *Primary Examiner.*